United States Patent [19]
Hess et al.

[11] 3,800,950
[45] Apr. 2, 1974

[54] APPARATUS FOR REMOVING OIL FROM WATER

[76] Inventors: Howard V. Hess; Edward L. Cole, both of P.O. Box 509, Fishkill, N.Y. 12508

[22] Filed: Jan. 8, 1971

[21] Appl. No.: 105,074

Related U.S. Application Data

[63] Continuation of Ser. No. 875,579, Nov. 10, 1969, abandoned, which is a continuation-in-part of Ser. No. 804,863, March 6, 1969, abandoned.

[52] U.S. Cl. .......................... 210/242, 210/DIG. 21
[51] Int. Cl. ........................................... E02b 15/04
[58] Field of Search .. 210/83, 242, 40, 65, DIG. 21, 210/39; 302/63

[56] References Cited
UNITED STATES PATENTS

| | | | |
|---|---|---|---|
| 2,235,542 | 3/1941 | Wenzel | 302/63 |
| 2,464,204 | 3/1949 | Balter | 210/40 X |
| 3,259,245 | 7/1966 | Earle | 210/DIG. 21 |
| 2,570,004 | 10/1951 | Penny | 302/63 |
| 2,720,425 | 10/1955 | Coanda | 302/63 |

FOREIGN PATENTS OR APPLICATIONS 666,990   1965   Belgium .................. 210/DIG. 21

OTHER PUBLICATIONS
Modern Plastics Encyclopedia, Vol. 45, No. 14, Pg. 51 September 1967, Sci. Library, TP 986.A2 M5, McGraw-Hill, 350 W. 42nd St., N.Y., N.Y.

*Primary Examiner*—Samih N. Zaharna
*Assistant Examiner*—T. A. Granger
*Attorney, Agent, or Firm*—T. H. Whaley; C. G. Ries

[57] ABSTRACT

Cleaning up hydrocarbon oil spills on a water surface which involves projecting open cellular particles of a highly oleophilic plastic foam such as polystyrene having a solvent affinity for petroleum substantially equivalent to that of polystyrene foam, to preferentially effect absorption of the oil and the agglomeration of the particles into lumps, mechanically recovering the lumps by screening and thereafter completely burning the oil saturated lumps to finally disposed thereof.

The apparatus for carrying out the method includes a heated foaming vessel supplied with foamable plastic particles and means for projecting the particles, after they have been foamed or expanded, upon oil floating on a water surface. These means include a barrel to which the foamed particles are conveyed as well as propulsive means which disintegrate the foamed particles into relatively small particulates, which are then cast onto the oil. Preferably the oil is surrounded by the foamed particles. The apparatus can be mounted on a barge or other vessel.

3 Claims, 5 Drawing Figures

APPARATUS FOR REMOVING OIL FROM WATER

CROSS REFERENCE TO CO-PENDING APPLICATION

This application is a continuation of our prior, co-pending application, Ser. No. 875,579 filed Nov. 10, 1969, now abandoned, as a continuation-in-part of our previous application, Ser. No. 804,863, filed Mar. 6, 1969 and now abandoned.

The present invention is concerned with cleaning up oil slicks or oil spills upon the surface of a body of water, such as may occur in the vicinity of marine oil terminals and shipping facilities.

The problem of cleaning up and disposing of oil spills floating on a body of water has become considerably more serious in continental waters as pollution becomes more general, because under these circumstances even small spills will aggravate a worsening situation. Major spills arising from offshore accidents, due to the sheer volume of oil involved can be calamitous.

Obviously the removal of this oil from the surface of a body of water involves major problems in waterways which are accompanied by varying degrees of turbulence and agitation. It has been proposed variously to, in effect, skim the oil from the surface somewhat in the manner of a plow by directing the oil into and up an inclined plane. It has also been proposed to recover the oil by suction devices operating on the water surface or by the use of surface weirs opened sufficiently to selectively receive the oil. Obviously none of these devices can be relied upon in a seaway.

As a result of the foregoing difficulties, devices have been developed by which the oil is caused to adhere to a a suitable surface which rotates or otherwise moves cyclically thru the water, to which the oil preferentially adheres and from which it is subsequently removed. Nevertheless with this type of device only a thin film of oil adheres, and in spite of the fact that the pick-up is continuous and the oil is likewise continuously scraped off the drum or belt, the recovery is small and is accompanied by substantial amounts of water.

It has also been proposed to employ a rotating device of this kind using a rather spongy plastic material to absorb the oil. While it is possible to use as the sponge, materials which have a preferential affinity for oil, nevertheless the oil must be continuously expressed or otherwise squeezed out of the spongy material if the process of oil recovery is to be continuous. This is complicated by the fact that spongy oleophilic materials which best absorb oil to the exclusion of water, at the same time may tend to become structurally weakened and damaged by this continuous process.

As a result, such materials soon become incapable of fully retaining their structural integrity, particularly under the repeated mechanical stresses of compression necessary to express the oil therefrom, and unless the material is necessarily mounted upon and supported by a rigid physical structure of some sort, it will soon become useless.

The present invention, on the other hand, employs a particulate oleophilic material having a maximum degree of affinity for oil, in the form of a spongy foam which floats on the surface of the water, with a highly attractive absorptive affinity for surface oil films. Finally the oil-saturated foam is collected, consumed and disposed of by burning.

This type of oleophilic absorbent foam is exemplified by styrofoam, namely the spongy, porous plastic polymers of styrene and its compounds (hereinafter referred to as styrene foam). These have a preferential affinity for oil, amounting to mutual solubility. Because the resulting effect upon the structural integrity of the sponge makes it virtually impossible to use such a material in the cyclic process of absorbing the oil in the sponge-like structure and thereafter expressing it from the polymer, the entire mass is consumed by combustion which takes place quickly, readily and without objectionable by-products or pollutants.

The characteristics of the oleophilic styrene foam in the presence of an oil film are strikingly characterized by the tendency of the foam saturated with oil to form oily lumps which immediately tend to agglomerate.

As a result, the oily particles tend to localize and are more readily picked up by nets or screens swept thru the water.

Furthermore, such of the agglomerates as escape recovery and disposal by burning, inevitably reach the beach as a localized agglomerate and do not spread out to contaminate an entire beach area. In other words the localized agglomerated lumps which are beached, due to the aforementioned solvent affinity for the oil, tend to retain the oil so that it resists leakage or spreading on the beach. As a result it may be more readily picked up or burned in situ without local damage.

Yet further, as previously intimated, the product burns readily and completely to non-pollutant and non-poisonous products, as distinguished, for example, from polyurethane foam, the combustion products of which may be extremely dangerous.

One of the advantages of the present invention is that the broadcast scattering of the particulate styrofoam plastic about the area of the spill enables it to be surrounded and confined simply by means of a gun, nozzle or other projector, and thus affords a means to immediately and promptly neutralize an entire area of contamination. In the case of an exceptionally vast spill, a boat circling the spill can set up a wide area or strip of floating particles to, in effect, enclose the spill and confine it until additional foam can be projected or dumped into the confined area.

Accordingly, therefore, the particulate foam may comprise pre-formed, plastic foam, preferably chopped in a suitable size of say up to one inch or two, but preferably not more than one-half inch across and projected out of a suitable pneumatic gun. Scrap, bulk styrene foam, the discard of molding or other manufacturing operations, is one cheap source of such foam.

Because, however, of the space requirements of an extremely low density foamed styrene polymer it is preferable to form the foam and project it in situ from a vessel or aircraft, for which reason it is specifically proposed to foam the plastic on board.

While the specific techniques of styrene foam manufacture have been long known and therefore form no part of the present invention, they are referred to hereinafter in general terms to enable selection of appropriate or preferred techniques necessary to conduct the present invention. Thus for maximum conservation of bulk space aboard a vessel, the foam may be prepared on board from unfoamed material such as the monomer, polymer or pre-polymer. In the case of a styrene polymer it becomes almost mandatory, in view of the relatively slow polymerization rate, to stock a nonfoamed polymer or prepolymer, in the form of crystals or of expandable beads or pellets, or as a high viscosity pre-polymer syrup having a high solid polymer content.

In the case of the latter type of operation, a prepolymer having a solid polymer content of upwards of 80 percent may be passed continuously thru a jacketed tube having a temperature up to about 215° C. to effect essentially complete polymerization, at which time the product is caught up and mixed with a foaming agent, such as butane or n-pentane or the like, which can be used to project it under pressure thru a gun barrel or nozzle. The well known popcorn polymers, for example, co-polymers of styrene with, for example, a small amount of (1–2 percent) divinyl benzene, illustrate this type of product.

By far the most attractive means of generating the polystyrene foam on board a vessel or other carrier involves the use of polystyrene beads, pellets or crystals which can be stored in a minimum of space on a work boat for example, and expanded as required into a foam which is mechanically spread upon the slick by a suitable projector.

As previously noted, expandable styrene polymers are well known and commercially available and specifically form no part of the present invention. Sufficient to say that at the elevated transition temperature at which the styrene polymer softens they are readily expandable by the incorporation of an expansion or blowing agent and also, where desired, suitable nucleating agents.

Reference is now made to the present drawing wherein

FIG. 1 discloses more or less diagrammatically an elevational view of a system for the foaming of polystyrene beads or pellets and their projection from a vessel;

Figure 1:
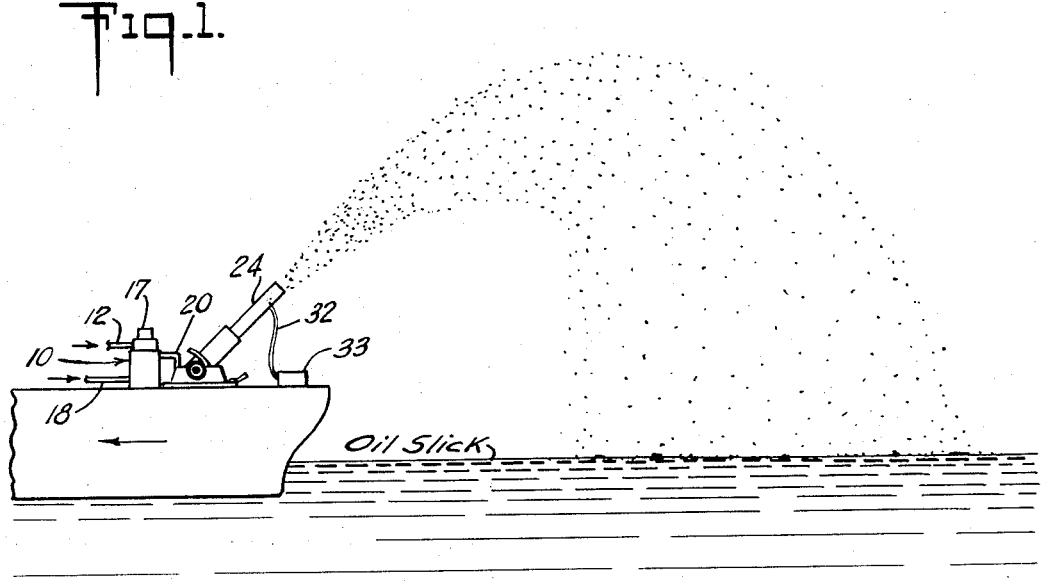
Figure 2:
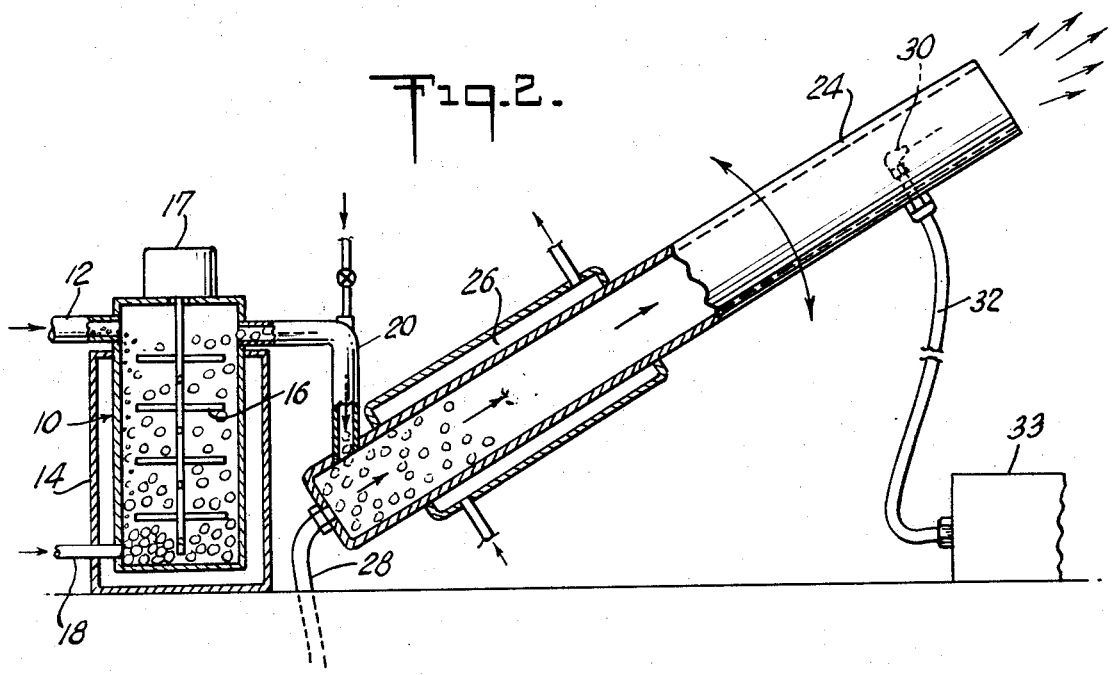
FIG. 2 is a detailed, vertical section taken thru the foaming and projecting means.

In the drawings the numeral 10 represents a polystyrene expander or foaming vessel which continuously receives a supply of expandable polystyrene beads or pellets from any suitable source, not shown, thru inlet 12. The vessel 10 is jacketed as shown at 14 or otherwise heated in any suitable manner to effect the heating of the beads or pellets to the softening point, as for example, the second-order transition point of the polystyrene.

The expandable beads contain a so-called, low boiling-point blowing agent, so that the vapor pressure of this agent causes the softened beads to expand into cells, the size of which is well known to those skilled in the art of plastic foam formation, as determined by the type and concentration of the blowing agent and the temperature of other processing conditions. As previously intimated, nucleating agents are added to facilitate the generation of small gas bubbles which then grow with the expansion of the vaporized blowing agent.

Of course these additives, while present in various commercial pellets, may be alternatively added to a mass of the polymer either prior to or in the expander 10. Furthermore it has been found advisable to incorporate in expanders of this type, a stirrer or agitator 16, which in the present case comprises a central shaft with projecting rods thereon which are rotated by motor 17, at a rate sufficient to prevent agglomeration of the polystyrene particles. Furthermore, inlet means 18 is provided for the injection of steam, heated air or other heated fluid as heat transfer and permeation medium either supplementally to or in lieu of the jacket 10.

In brief, therefore, the pellets are by this means caused to expand, say for example, from 10 to 40 times their original volume at which time they are selectively conveyed by standpipe 20 into the lower extremity of a barrel 24. The elongated lower end of the barrel may be jacketed or otherwise heated as at 26, or, as in the expander, the source of heat to maintain the required temperature may be supplied by additional steam, hot air or blowing agent supplied from sources not shown, thru pipe 28. As a matter of fact, the incorporation or use of a suitable blowing agent in the expander and barrel such as butane or n-pentane, under substantial pressure, may permit the incorporation of reduced quantities of blowing agent in the pellets or may enable use of polystyrene crystals essentially free from blowing agent. With this arrangement therefore, substantially increased temperatures in the lower portion of the barrel effect increased fluidity of the polymers which continuously move into the barrel of the projector. Finally, at a relatively short distance from the muzzle of the barrel, is located a projection nozzle or nozzles 30, supplied with steam, air or additional blowing gas via pipe 32 and compressor 33.

Preferably sizeable pressures are sufficient to give the final required impulse to disintegrate the foam into relatively small particles and to lift and project it on the wind.

By way of example, a vessel so equipped proceeds around a spill, encompassing it with the finely particulate foam of high porosity in open cellular structure. Thereupon, after the spill has been covered and the oily materials have been completely absorbed into the foam the aforementioned agglomerating tendency of the oil-saturated particulates begins to assert itself under the influence of the typically agitated surface of the body of water. Hence the oil saturated particles of foam adhere to one another, ultimately forming into lumps or balls. As further indicated, these balls are readily picked up and recovered by nets or screens carried by suitable vessels and moreover can be readily burned either in ordinary furnaces provided for this purpose or in various power plant boilers.

Figure 3:
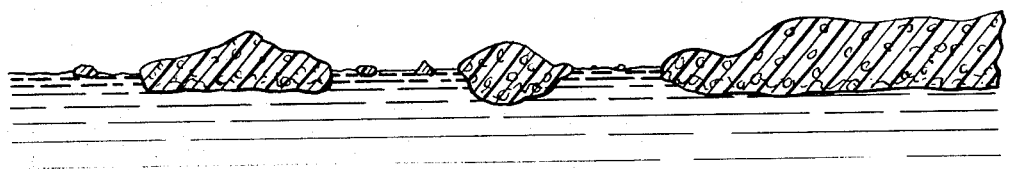
FIG. 3 is a detailed view, diagrammatically representing the agglomerated product.

Thus, for example, FIG. 3 illustrates the manner in which the particles tend to saturate with oil to form semi-fluent masses which ultimately tend to join up into single lumps.

Figure 4:
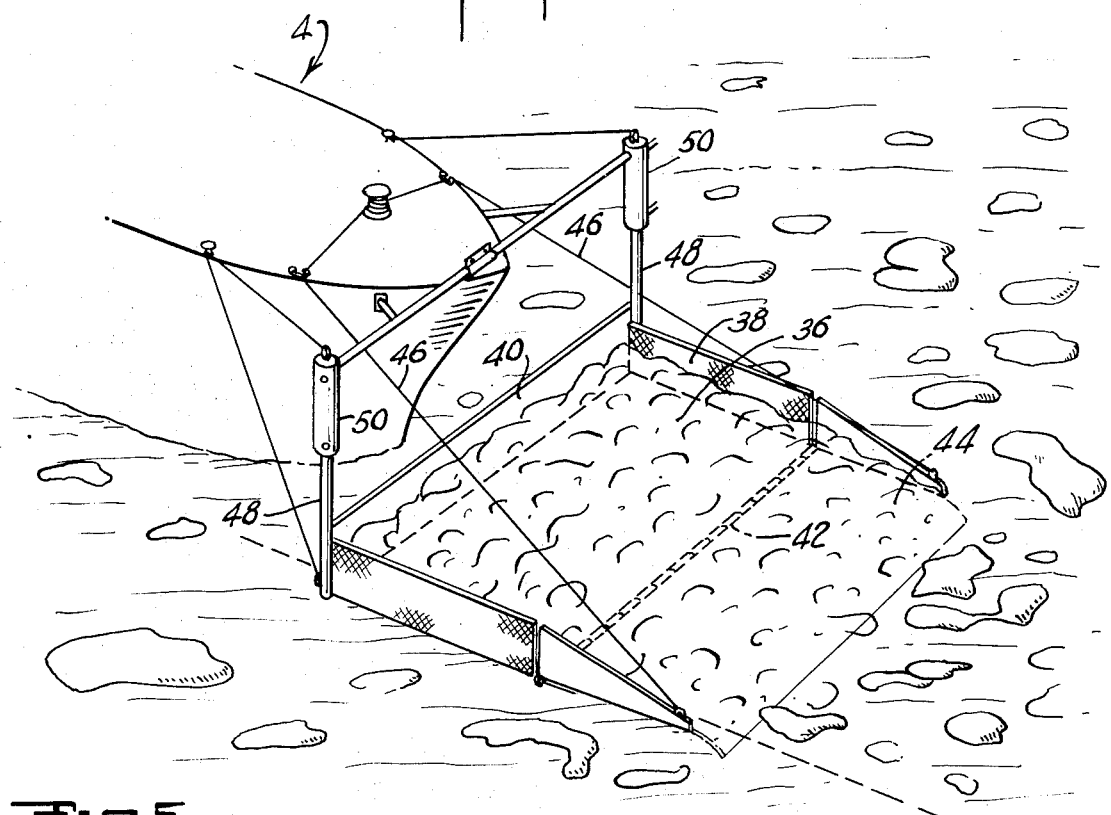
FIGS. 4 & 5 are perspective views of a form of recovery screen for picking up the oily product.
Figure 5:
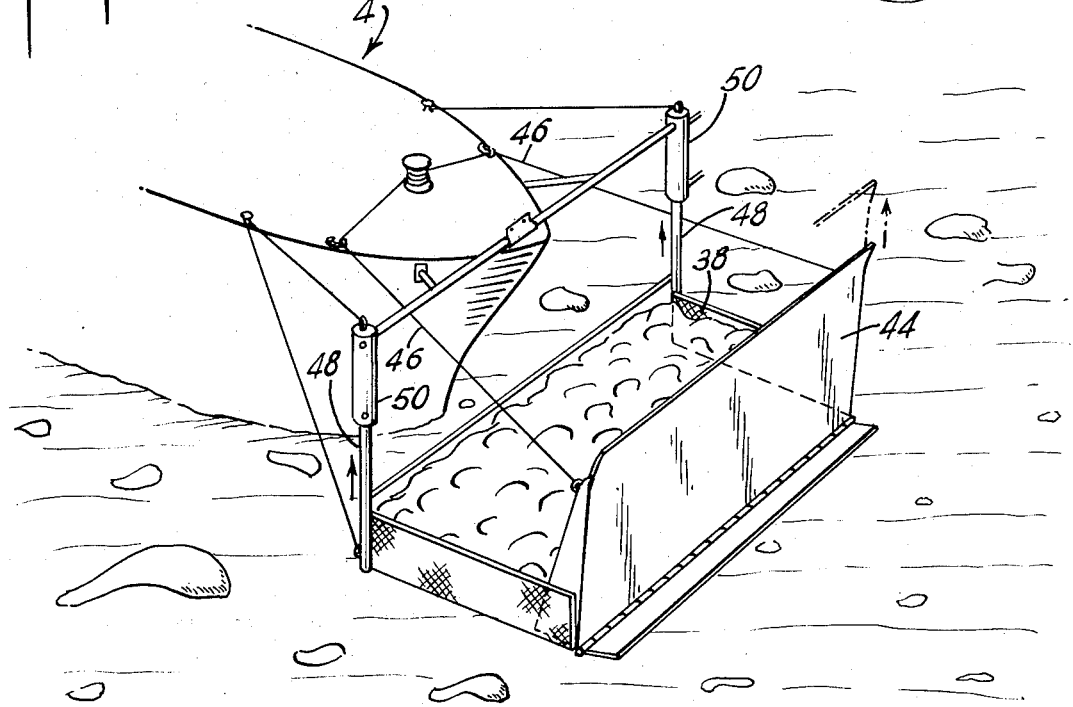

FIGS. 4 & 5 illustrate one particular form of pick up screen which may be mounted on the bow of a vessel or barge, indicated more or less diagrammatically by the reference numeral 34. The screen comprises lower reticulate surface 36, sides 38 and rear screen 40. Hinged thereto as at 42, is a blade 44 which is permitted to extend just below the surface of the water by lines 46 in order to skim the surface flotsam into the screen.

The screen is mounted upon and supported by upwardly extending rearward columns 48, extending into hydraulic pistons 50. Accordingly, when the screen is loaded with lumps of oil-saturated plastic the skimmer blade 44 is raised vertically as is shown in FIG. 5, and the hydraulic members 50 may thereafter be actuated to lift the screen out of the water so that the contents thereof can be removed and transferred to the boilers of the vessel. Any suitable recovering and conveying means may be used for this purpose. It is equally suitable to collect the lumps of floating debris by means of a trawl or other suitable net dragged thru the water.

A series of experiments was performed as follows to determine the relative effectiveness of particulate polystyrene foam in removing oil from the surface of water and closed cell slurried foam of the same material, involving a uniform test procedure consisting of the following steps:

In a vessel containing sea water is deposited at 75°F. an oil slick comprising approximately 60 grams of Arabian Crude, having the following characteristics:

| | |
|---|---|
| Gravity, ° API | 27.0 |
| Carbon residue, wt % | 5.55 |
| Sulfur, wt % | 3.2 |
| Pour point, ° F | +35 |
| Gas Oil Dist. | |
| IBP | 130 |
| 10 | 270 |
| 20 | 390 |
| 30 | 507 |
| 33 | 530 |

The amount of crude as deposited on the water is sufficient to form an approximately 9–10 inch diameter oil slick. Immediately thereafter, approximately 5 grams of 5–20 mesh, uncrushed, polystyrene crumb foam is distributed over the surface of the spill. After three minutes of quiescence, a 4 inch square wire screen is passed across the oil slick to pick up the oil. Two grades of wire screening are used, one ¼ inch mesh and the other 1/16 inch mesh. The amount of oil thus recovered is recorded and determination thereafter made of the amount of water in the recovered oil.

Three experiments, A, B & C were carried out follow-in the above procedure, in which the sole material variable was the condition of the expanded polystyrene crumb as follows:

EXAMPLE A

Dry, untreated, particulate polystyrene crumb foam 5–20 mesh.

EXAMPLE B

Polystyrene as in Example A was placed in a steel cylinder 2¾ inch diameter to a depth of 1⅝ inches and the contents compressed to a depth of ½ inch or 2/13 the original volume. The compressed polystyrene was then added to 150 ml of water containing three drops of a surface active agent comprising liquid potash soap. The mixture was then slurried.

EXAMPLE C

Polystyrene foam as in Example A was added to 150 ml of water containing three drops of said surface active agent comprising liquid potash soap and formed to a uniform slurry.

The following are the results of the three comparative tests:

| | Oil Slick (grams) | Oil Recovered | Water Separated with Oil (ml) | Note |
|---|---|---|---|---|
| A | 59 | 99% | 5.5 | ¼ inch and 1/16 mesh equally effective. |
| B | 64 | 75% | 16 | Polystyrene distributed as water slurry. Oil wetting obviously imperfect. ¼ inch mesh ineffective. |
| C | 57 | 95% | 27 | ¼ inch mesh ineffective. Oil difficultly removable even with 1/16 inch screen. Polystyrene tends to sink in water. |

From the foregoing it was concluded that pre-slurried polystyrene is difficultly wettable by oil, cannot be removed by the ¼ inch screen and difficultly removable even with the fine screen, and further that compression of the pre-slurried polystyrene foam, merely to the extent of 2/13 its original volume so affects the internal structure as to seriously impair its oil absorptive qualities. For this reason it can be concluded that the distribution of dry, uncrushed, freshly foamed, particulate polystyrene on the surface of an oil slick is appreciably more effective in recovering oil than crushed, aqueous slurries.

While in the present specification the invention has been described mainly with respect to the use of styrene co-polymers, it will be understood that equivalent resins may also be used.

We claim:

1. Apparatus for removing oil from the surface of an area of water by using oleophilic foamed plastic, comprising in combination a ship, and on said ship: a foaming vessel adapted to receive foamable plastic particles and to foam said particles; means for projecting said particles after foaming thereof upon said oil on said surface, said means including a barrel receiving said foamed particles and propulsion means for disintegrating said foamed particles into relatively small particulates and for casting said particulates onto said oil, basket-like means mounted on said ship for mechanically recovering agglomerates of oil and foamed plastic particulates, said means including screens forming an open ended basket, skimmer blade means connected to the open end of said basket and hinged thereto to provide closure means for said basket, and actuating means for raising said basket and said blade when said basket is substantially filled with said agglomerates.

2. Apparatus according to claim 1, wherein said means for projecting said particulates consist of a pneumatic gun.

3. Apparatus according to claim 1, wherein said means for raising said basket are hydraulic.

* * * * *